(12) United States Patent
Block et al.

(10) Patent No.: US 7,801,397 B2
(45) Date of Patent: Sep. 21, 2010

(54) EFFICIENT LIGHT COUPLER FROM OFF-CHIP TO ON-CHIP WAVEGUIDES

(75) Inventors: Bruce A. Block, Portland, OR (US);
Paul Davids, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/031,665

(22) Filed: Feb. 14, 2008

(65) Prior Publication Data

US 2008/0138009 A1 Jun. 12, 2008

Related U.S. Application Data

(63) Continuation of application No. 10/421,640, filed on Apr. 22, 2003, now Pat. No. 7,343,058.

(51) Int. Cl.
*G02B 6/12* (2006.01)
*G02B 6/26* (2006.01)
*G02B 6/32* (2006.01)
*G02B 6/42* (2006.01)
*G02B 6/36* (2006.01)
*G02B 6/44* (2006.01)

(52) U.S. Cl. ............................ 385/14; 385/30; 385/31; 385/35; 385/88; 385/114

(58) Field of Classification Search .................. 385/14, 385/30
See application file for complete search history.

(56) References Cited

U.S. PATENT DOCUMENTS

| | | | |
|---|---|---|---|
| 5,163,113 A | 11/1992 | Melman | |
| 5,416,870 A * | 5/1995 | Chun et al. | 385/88 |
| 5,499,312 A * | 3/1996 | Hahn et al. | 385/91 |
| 5,761,350 A | 6/1998 | Koh | |
| 5,786,925 A | 7/1998 | Goossen et al. | |
| 5,987,202 A | 11/1999 | Gruenwald et al. | |
| 6,081,638 A | 6/2000 | Zhou | |
| 6,285,808 B1 | 9/2001 | Mehlhorn et al. | |
| 6,373,872 B2 | 4/2002 | Deacon | |
| 6,389,202 B1 | 5/2002 | Delpiano et al. | |
| 6,438,281 B1 | 8/2002 | Tsukamoto et al. | |
| 6,649,990 B2 * | 11/2003 | Morse | 257/431 |
| 6,804,440 B2 * | 10/2004 | Lee et al. | 385/114 |

(Continued)

OTHER PUBLICATIONS

Vusirikala et al., Flip-chip Optical Fiber Attachment to a Monolithic Optical Receiver Chip, SPIE, vol. 2613.*

(Continued)

*Primary Examiner*—Mark A Robinson
*Assistant Examiner*—Erin D Chiem
(74) *Attorney, Agent, or Firm*—Blakely, Sokoloff, Taylor & Zafman LLP (57) ABSTRACT

In an embodiment, light from a single mode light source may be deflected into a low index contrast (LIC) waveguide in an opto-electronic integrated circuit (OEIC) (or "opto-electronic chip") by a 45 degree mirror. The mirror may be formed by polishing an edge of the die at a 45 degree angle and coating the polished edge with a metal layer. Light coupled into the LIC waveguide may then be transferred from the LIC waveguide to a high index contrast (HIC) waveguide by evanescent coupling.

26 Claims, 10 Drawing Sheets

U.S. PATENT DOCUMENTS

| | | |
|---|---|---|
| 6,869,229 B2 | 3/2005 | Reedy et al. |
| 6,952,504 B2 | 10/2005 | Bi et al. |
| 6,987,906 B2 | 1/2006 | Nakama et al. |
| 2002/0118916 A1 | 8/2002 | Lee et al. |
| 2003/0044118 A1 | 3/2003 | Zhou et al. |
| 2003/0118288 A1 | 6/2003 | Korenaga et al. |
| 2003/0161573 A1 * | 8/2003 | Ishida et al. ............ 385/14 |
| 2004/0017977 A1 | 1/2004 | Lam et al. |
| 2006/0128059 A1 * | 6/2006 | Ahn et al. ............ 438/108 |

OTHER PUBLICATIONS

Moerman, I., et al., "A Review on Fabrication Technologies for the Monolithic Integration of Tapers with III-V Semiconductor Devices", *IEEE Journal of Selected Topics in Quantum Electronics*, 3(6):1308-1320, Dec. 1997.

* cited by examiner

EFFICIENT LIGHT COUPLER FROM OFF-CHIP TO ON-CHIP WAVEGUIDES

CROSS-REFERENCE TO RELATED APPLICATIONS

This application is a continuation application of and claims priority to U.S. patent application Ser. No. 10/421,640, filed Apr. 22, 2003 now U.S. Pat. No. 7,343,058. The disclosure of the prior application is considered part of (and is incorporated by reference) the disclosure of this application.

BACKGROUND

Opto-electronic integrated circuits (OEICs) may incorporate both electronic circuits and optical devices, such as integrated waveguides, modulators, switches, and detectors. The optical devices may be used for, e.g., optical clock distribution, intra-chip optical signaling, and chip-to-chip communication Both the electronic circuits and optical devices may be produced on silicon using complementary metal-oxide semiconductor (CMOS) fabrication techniques.

Light utilized by optical devices in an OEIC may be introduced into the chip by an external source, such as a vertical cavity surface emitting laser (VCSEL) or an optical fiber. The light from the external source may have a relatively large mode compared to that of the on-chip waveguides. The differences in mode size may present difficulties in efficiently coupling the relatively large mode off-chip light source to a small waveguide on the chip.

DETAILED DESCRIPTION

Figure 1:
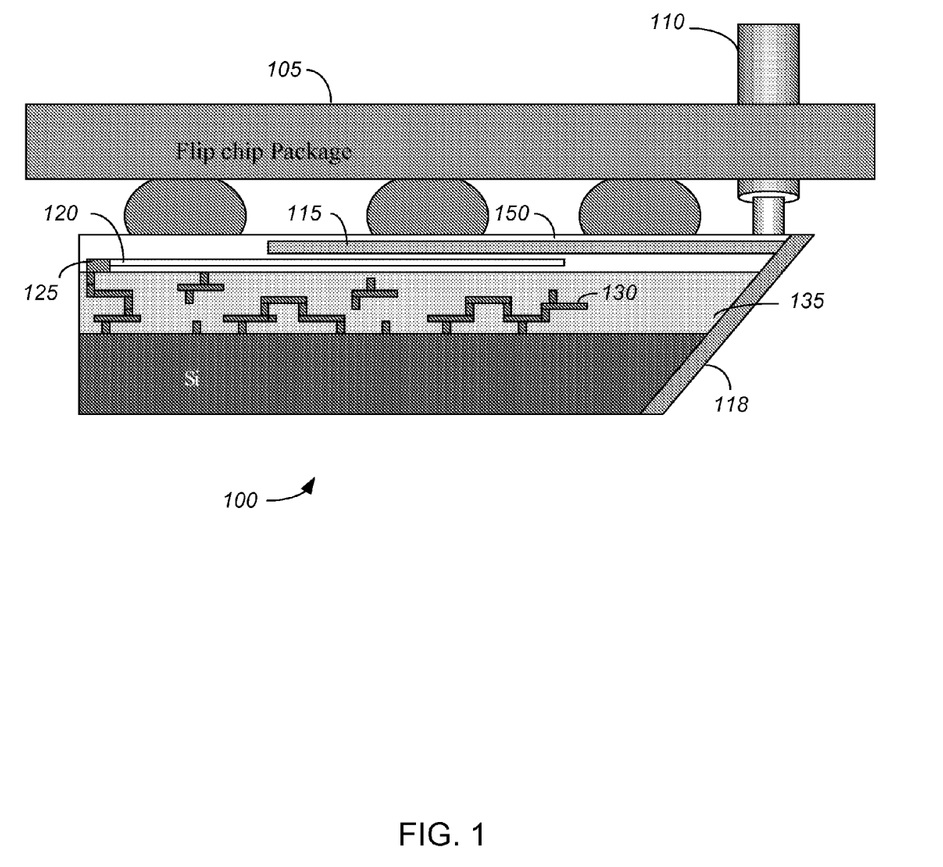
FIG. 1 is a cross-sectional view of an opto-electronic chip bonded to a flip chip.

FIG. 1 shows an opto-electronic integrated circuit (OEIC) (or "opto-electronic chip") 100 coupled to a flip chip package 105. The flip chip package may include a light source 110, e.g., a laser or optical fiber. Modulated light signals from the light source may be deflected into a low index contrast (LIC) waveguide 115 by a 45 degree mirror 118. The LIC waveguide may be mode-matched to the light source 110 to minimize coupling loss. Light coupled into the LIC waveguide 110 may then be transferred from the LIC waveguide to a high index contrast (HIC) waveguide 120 by evanescent coupling.

Figure 2:
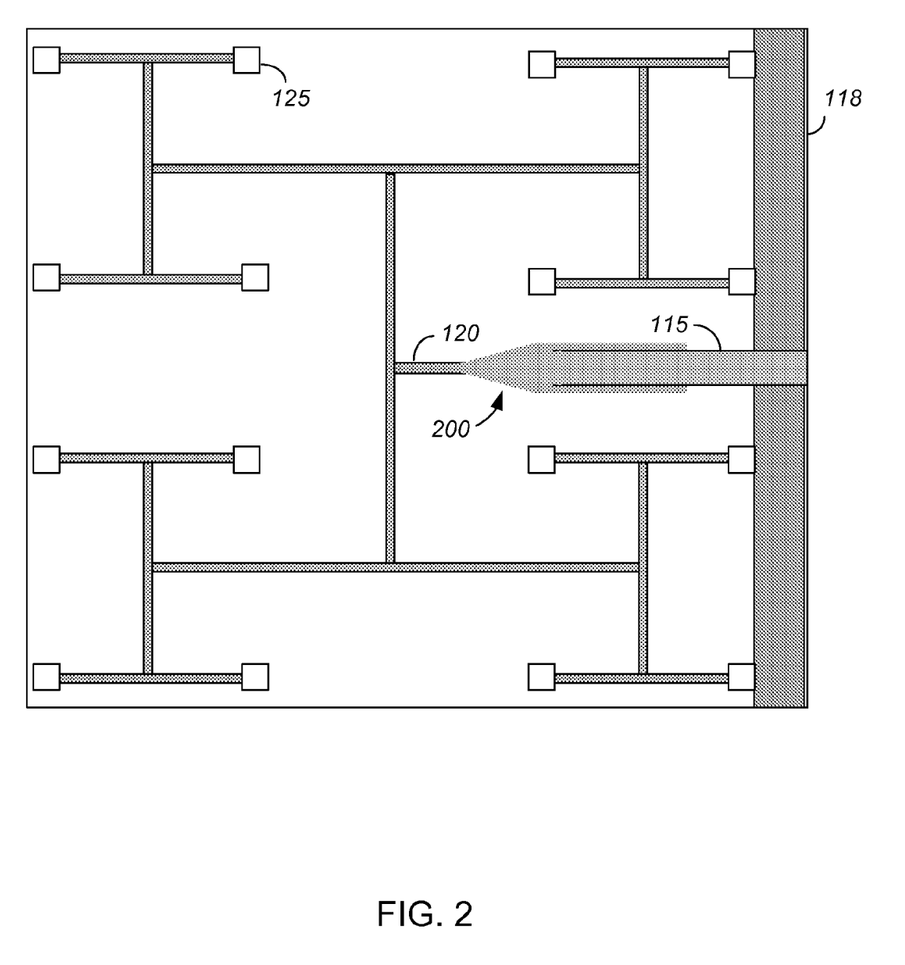
FIG. 2 is a plan view of an optical layer in the opto-electronic chip.

The HIC waveguide 120 may be laid out in a pattern, e.g., a tree structure, to distribute the light across the chip, as shown in FIG. 2. Photodetectors 125 may convert the light signals into electrical signals. The electrical signals may be transferred to electronic circuitry in the chip through electrical interconnects 130 in metallization layers 135 of the chip 100.

The light source may be a single mode (SM) optical fiber, VCSEL (Vertical Cavity Surface Emitting Laser), or other single mode semiconductor laser. "Mode" refers to the solution of Maxwell's wave equation satisfying the boundary conditions of the waveguide, thus forming a unique pattern of standing wave in the radial direction on the cross section of the waveguide. A mode is characterized by its propagation constant (eigenvalue of the wave equation). A single mode light source may be appropriate for the relatively small waveguides present in the opto-electronic chip.

The light source may be positioned vertically with respect to the device side of the chip and placed in close proximity. The light may impinge on the surface of the chip and be transmitted through a transparent cladding film 150 (e.g., $SiO_2$) and across the LIC waveguide material 115. Anti-reflective (AR) coatings may be provided on the chip surface to avoid reflection.

The light may then strike a 45 degree metal mirror and be reflected 90 degrees, in the same direction as the waveguide, i.e., parallel to the chip surface. The light may be trapped by total internal reflection and coupled into the LIC waveguide 115. The index contrast of this waveguide (e.g., the difference between the indexes of refraction of the waveguide core and the surrounding cladding layer) may be tailored such that the mode size is close to that of the fiber to promote efficient coupling, thereby reducing the power requirement for the off-chip light source.

As shown in FIGS. 1 and 2, the LIC waveguide 115 may be larger than the HIC waveguide 120. The mode of the LIC waveguide 115 may more closely match the mode of the light source 110. However, the bend radii of HIC waveguides may be much smaller (e.g., less than about 50 microns) compared to LIC waveguides, which may be only able to bend at about 1 mm radius. Having a smaller alloable bend radius allows for more efficient distribution of light about the chip. Accordingly, the LIC waveguide 115 may be used to couple light into the chip, and the HIC waveguide(s) 120 may be used for distribution and signaling.

Figure 3:
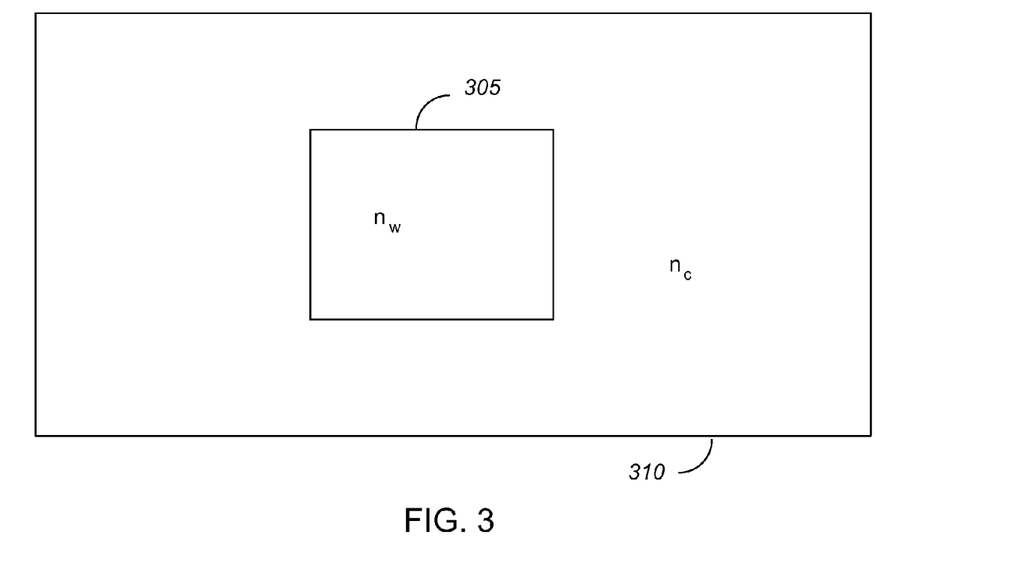
FIG. 3 is a sectional view of an integrated waveguide structure.
Figure 4:
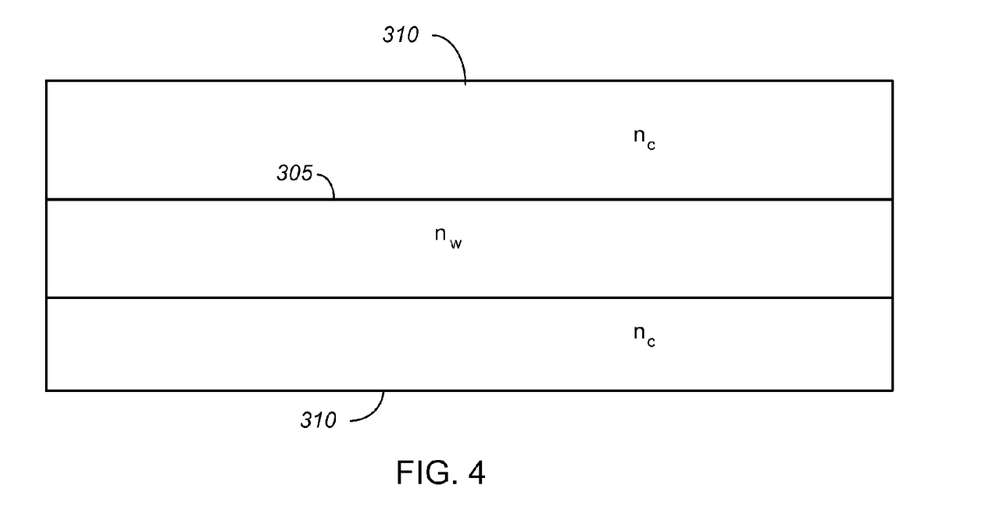
FIG. 4 is a plan view of an integrated waveguide structure.

A cross section and a top view of an integrated waveguide are shown in FIGS. 3 and 4, respectively. The waveguide may be an optically guiding core 305 of a material with refractive index $n_w$ surrounded by a cladding material with a different index of refraction, $n_c$. The high contrast of the refractive index between the two materials confines a lightwave to the waveguide 305. The cladding material may be, e.g., silicon oxide ($SiO_2$) ($n_c \approx 1.5$). The waveguide material may be selected from, e.g., silicon nitride ($Si_3N_4$)($n_w \approx 2$), silicon (Si) ($n_w \approx 3$), and silicon oxynitride (SiON) ($n_w \approx 1.55$). Silicon oxynitride may offer design flexibility because its refractive index may be varied by changing the content of nitrogen. The difference in the indexes of refraction between the core and the cladding determines the contrast, e.g., high index contrast or low index contrast.

Light may be transferred from the LIC waveguide 115 to the HIC waveguide 120 by evanescent coupling. Since the index of the HIC waveguide 120 is higher than that of the LIC waveguide 115, the light gets coupled through the evanescent tail of the low index contrast mode. A lithographically patterned taper 200 may be used at the end of the LIC waveguide to make the transfer occur over a shorter length, as shown in FIG. 2. The interaction length may be designed such that substantially all of the light is transferred to the lower HIC waveguide 120.

Figure 5:
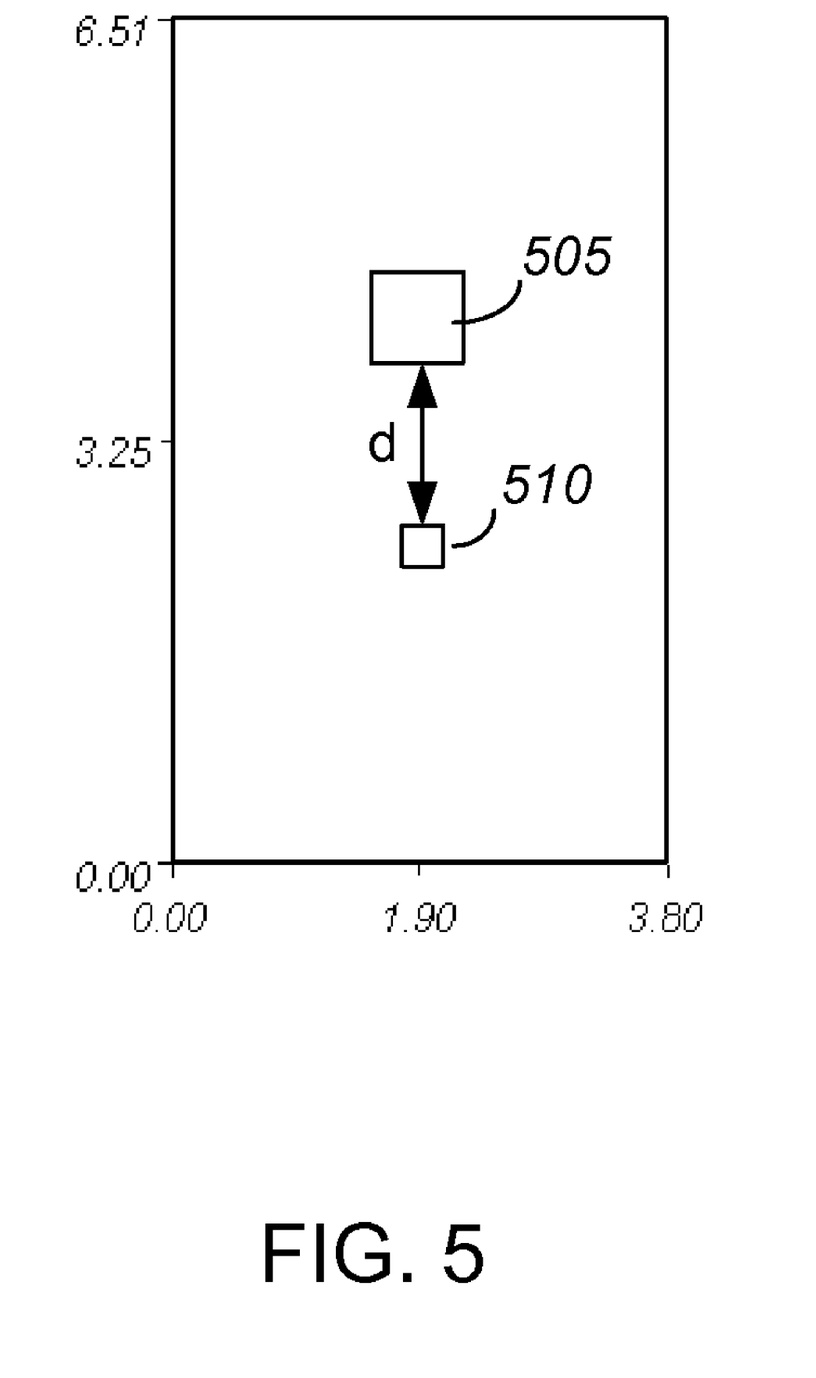
FIG. 5 is a sectional view of adjacent low and high index contrast waveguides.
Figure 6:
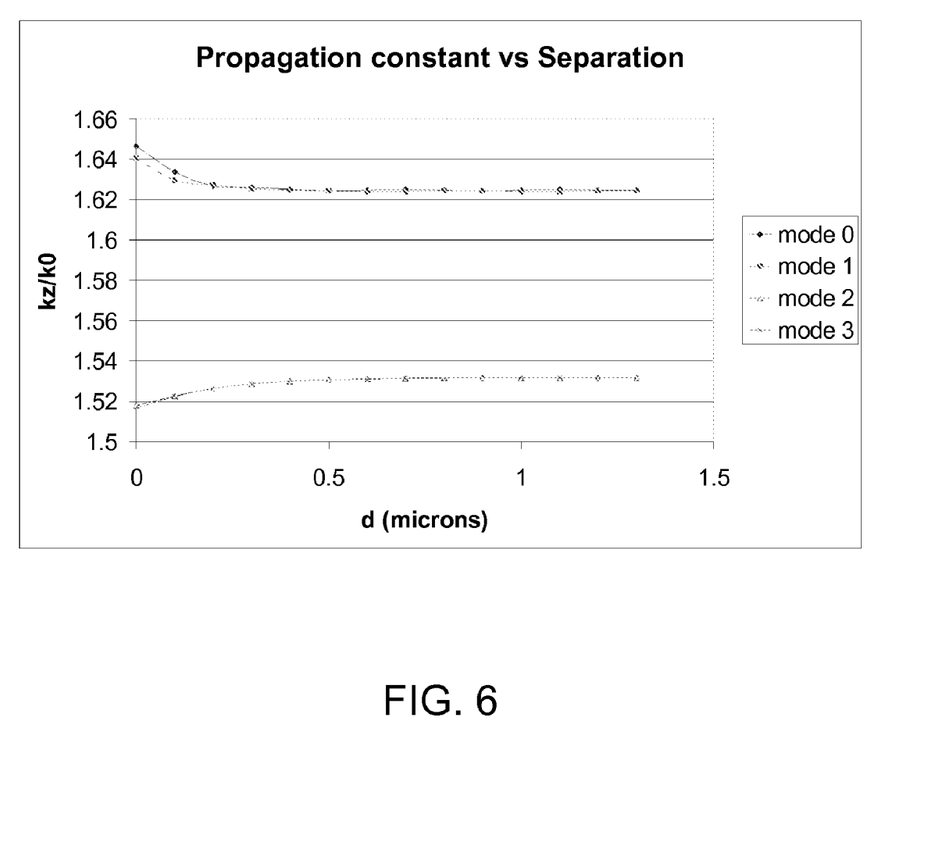
FIG. 6 is a chart showing the normalized propagation constant as a function of the separation of the waveguides of FIG. 5.
Figure 7A:
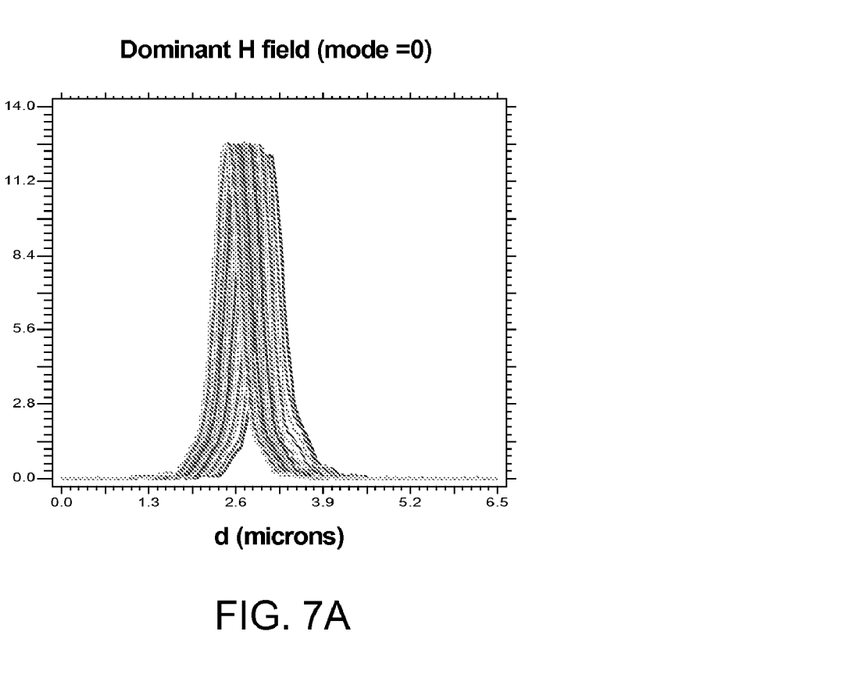
FIGS. 7A and 7B are plots showing the localization of the dispersion curve in the waveguides of FIG. 5.
Figure 7B:
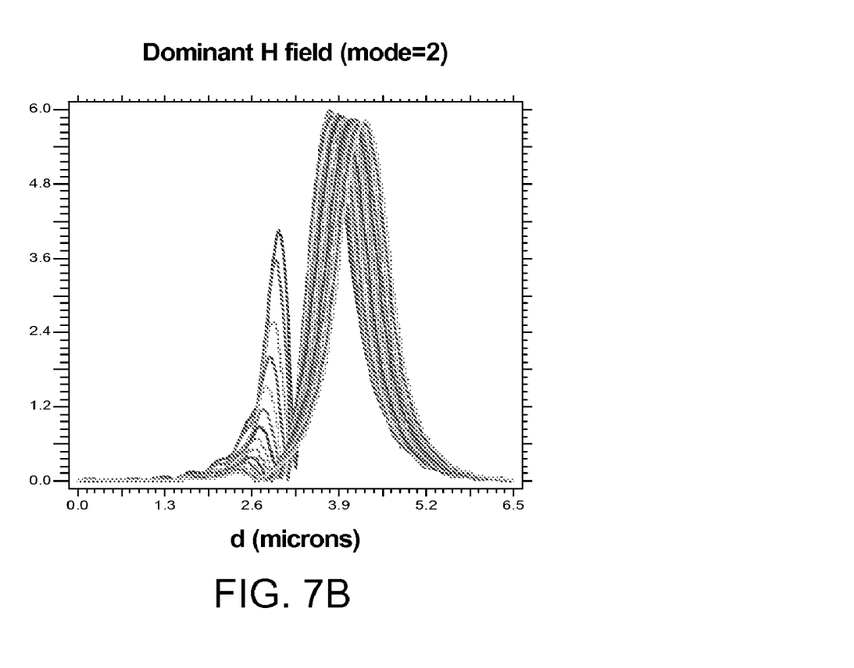
Figure 8A:
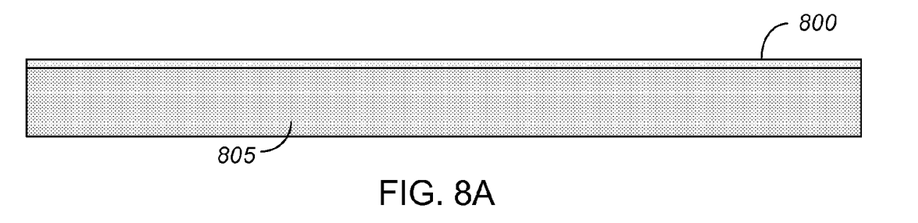
FIGS. 8A-8J show steps in an exemplary process for fabricating the opto-electronic chip shown in FIG. 1.
Figure 8B:
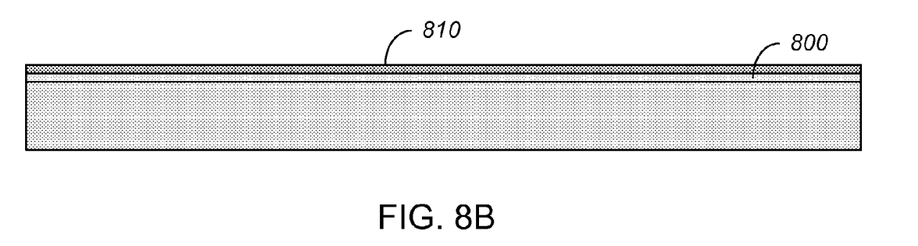
Figure 8C:
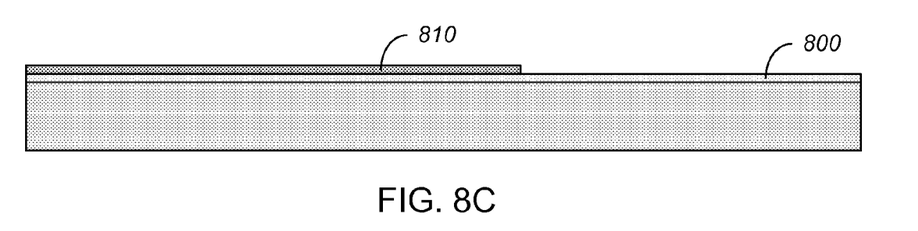
Figure 8D:
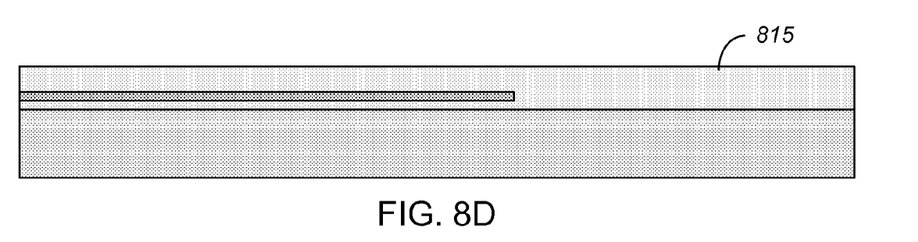
Figure 8E:
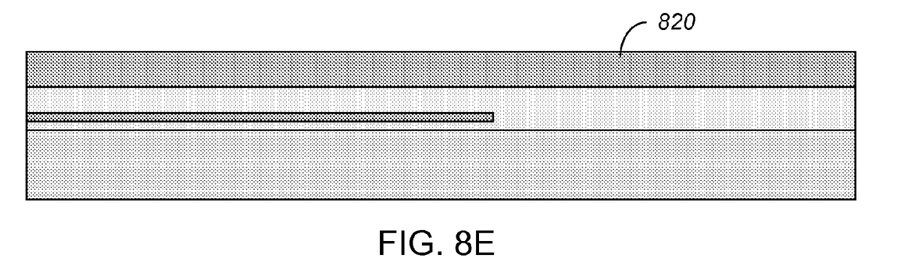
Figure 8F:
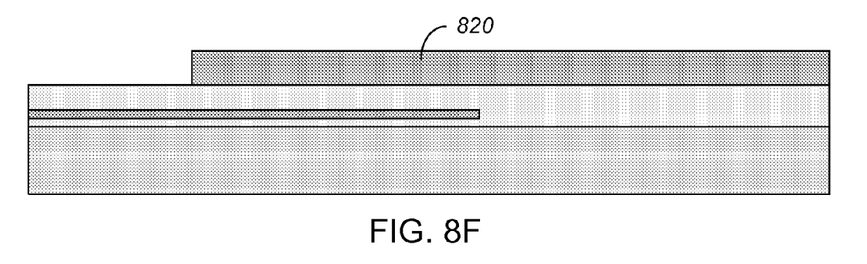
Figure 8G:
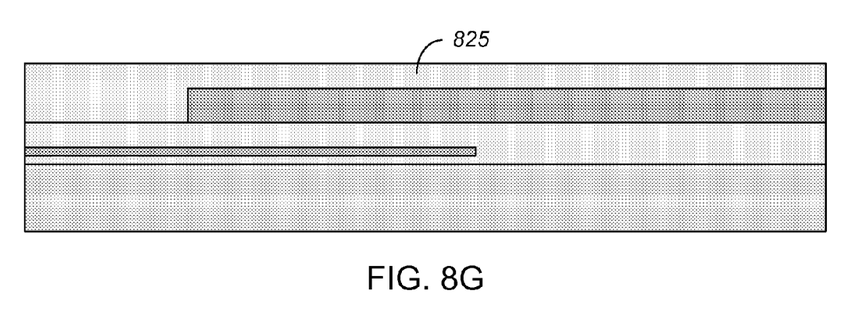
Figure 8H:
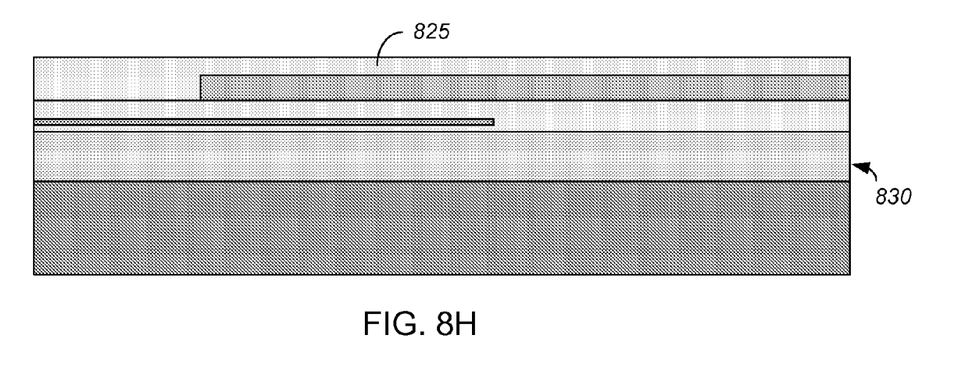
Figure 8I:
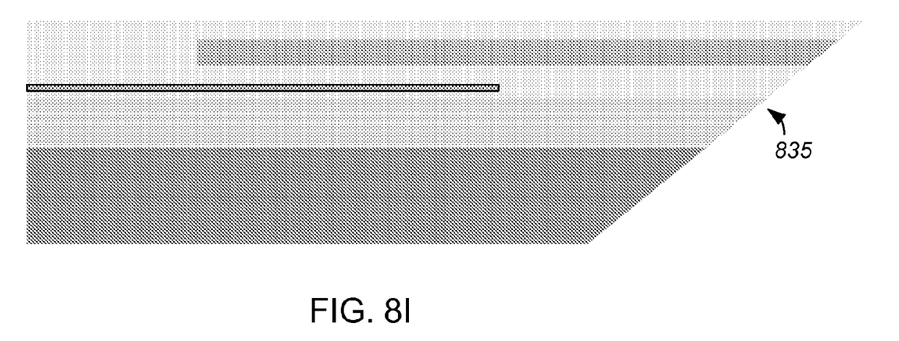
Figure 8J:
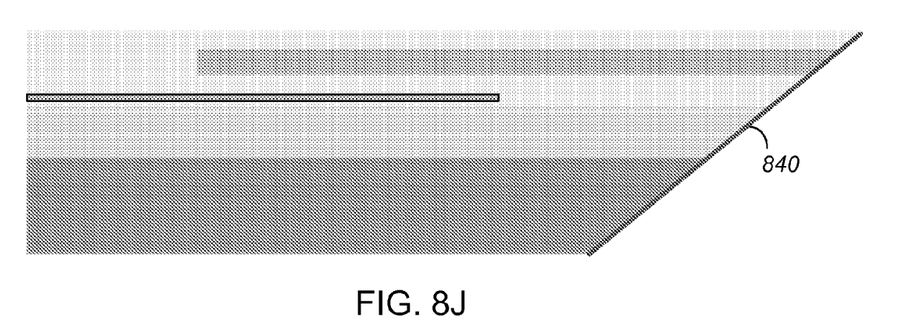

FIG. 5 shows two single mode waveguides 505, 510 with $n_{w1}=1.6$ (LIC) and $n_{w2}=2.0$ (HIC), respectively, and cladding index $n_c=1.5$. The distance "d" may be varied from 0.0 to 1.2 microns. FIGS. 6 and 7A-B illustrate modeling simulations for this waveguide configuration. FIG. 6 is a chart illustrating the normalized propagation constant as a function of the separation of waveguides. Each waveguide contains a doubly degenerate effective index when isolated. The upper branch of dispersion may be asymmetric mode localized to the HIC waveguide 510 (modes 0 and 1) and the lower branch corresponds to LIC waveguide (modes 2 and 3). FIG. 7A shows that the upper branch of the dispersion curve is localized in the HIC waveguide and is weakly coupled to the LIC waveguide. FIG. 7B shows that the lower branch of the dispersion curve is localized in LIC waveguide and strongly coupled to HIC waveguide. The coupling efficiency ranges from 70% at d=0.0 to 20% at d=0.5 based on the ratio of peak amplitudes in waveguides.

FIGS. 8A-J show stages in the fabrication of the optical layers and 45 degree mirror in the chip according to an embodiment. A lower cladding film 800, such as $SiO_2$ may be deposited on the top of the last metallization layer 805 in the chip, which may include electrical interconnect lines to electronic circuitry in the chip. A core material 810 for the HIC waveguide 120, such as $Si_3N_4$, may be deposited on the lower cladding film 800. The silicon nitride layer may then be etched to form a HIC waveguide pattern. An intermediate cladding layer 815, e.g., silicon dioxide, may be deposited over the HIC waveguide layer 810. Next, a core material 820 for the LIC waveguide 115 may be deposited on the intermediate cladding layer 815. The silicon oxynitride layer may then be etched to form a LIC waveguide pattern. An upper cladding layer 825 may then be deposited on the LIC waveguide pattern.

The wafer may then be diced, producing an edge 830. The edge 830 of the die may be polished to a 45 degree angle edge 835. A thin layer 840 of a metal material such as Al may be applied, e.g., by sputtering or evaporation. Anti-reflective coatings may also be added to the top surface to reduce reflection. The light source, e.g., an optical fiber, may then be joined to the top of the upper cladding layer 825 of the LIC waveguide, e.g., melting the fiber to adhere to the surface or by use of an adhesive.

Figure 9:
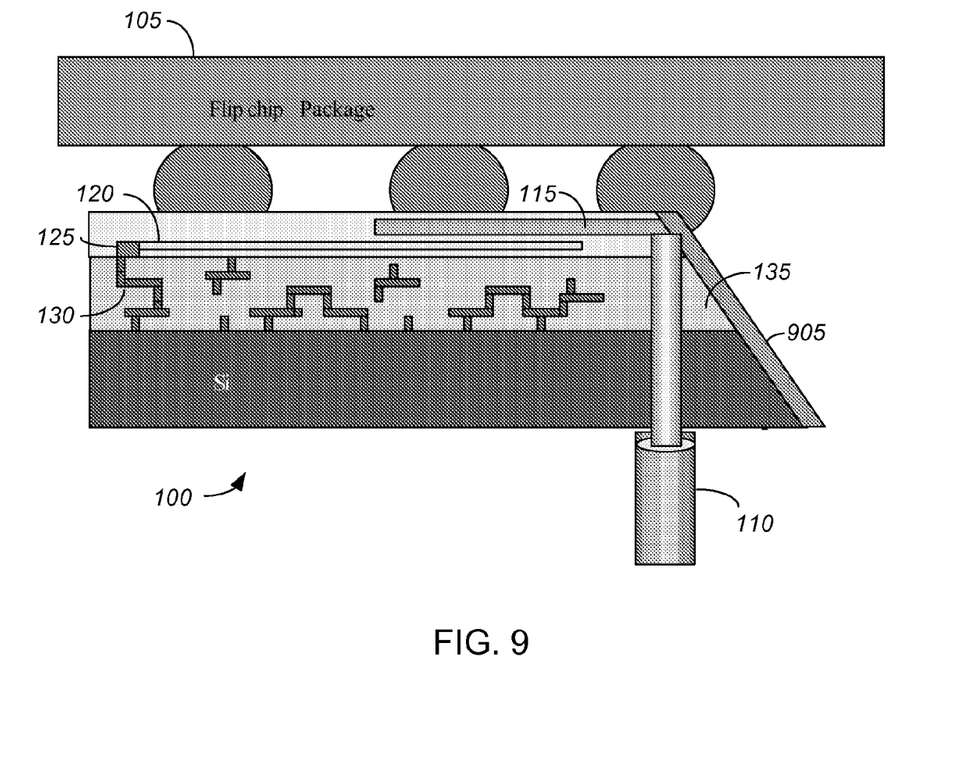
FIG. 9 shows an opto-electronic chip according to an alternative embodiment.

In another embodiment, light may enter the backside surface of the chip and hit a mirror 905 which is polished at 45 degrees, as in FIG. 9. This structure may be used with light having a wavelength greater than about 1.2 microns.

A number of embodiments have been described. Nevertheless, it will be understood that various modifications may be made without departing from the spirit and scope of the invention. Accordingly, other embodiments are within the scope of the following claims.

What is claimed is:

1. An apparatus comprising:
    an opto-electronic chip;
    an optical waveguide substantially parallel to a surface of the opto-electronic chip and disposed within the opto-electronic chip wherein the optical waveguide comprises a low index contrast waveguide;
    a high index contrast waveguide adjacent the low index contrast waveguide, wherein the high index contrast waveguide is separated from the low index contrast waveguide by a distance that allows light to evanescently couple from the low index contrast waveguide into the high index contrast waveguide; and
    a mirror formed from an angled edge of the waveguide and a layer of reflective material coated thereon, the mirror positioned to direct light from outside the opto-electronic chip into the optical waveguide.

2. The apparatus of claim 1, wherein the angled edge comprises an angled outer edge of the opto-electronic chip.

3. The apparatus of claim 1, wherein the waveguide is dimension to end within the opto-electronic chip.

4. The apparatus of claim 1, wherein the waveguide comprises a patterned waveguide to distribute the light across the opto-electronic chip.

5. The apparatus of claim 4, wherein the patterned waveguide comprises a tree structure pattern.

6. The apparatus of claim 4, wherein the patterned waveguide comprises at least two branches.

7. The apparatus of claim 1, wherein the waveguide comprises:
    a first cladding layer;
    a second cladding layer; and
    a core material etched to form a waveguide pattern,
        wherein the core material is bounded on a first side by the first cladding layer and on a second side by the second cladding layer.

8. The apparatus of claim 1, further comprising a fiber optic light source coupled to the opto-electronic chip at a position such that light from the fiber optic light source is directed into the opto-electronic chip by the mirror.

9. The apparatus of claim 1, wherein the mirror is also formed from an angled edge of the opto-electronic chip.

10. The apparatus of claim 1, wherein the mirror is positioned to direct light from above the opto-electronic chip into the optical waveguide.

11. The apparatus of claim 1, wherein the opto-electronic chip incorporates an integrated electronic circuit.

12. The apparatus of claim 11, wherein the integrated electronic circuit comprises a complementary metal-oxide semiconductor (CMOS) circuit.

13. The apparatus of claim 12, wherein the optical device comprises a complementary metal-oxide semiconductor (CMOS) device.

14. The apparatus of claim 1, wherein the opto-electronic chip incorporates an optical device.

15. An apparatus comprising:
    a light source;
    an opto-electronic integrated circuit comprising
        a substrate,
        an integrated optical waveguide substantially parallel to a surface of the opto-electronic integrated circuit and disposed within the opto-electronic integrated circuit, the integrated optical waveguide comprises a high index contrast waveguide;
        a low index contrast waveguide that is spaced apart from the high index contrast waveguide so that light can evanescently couple from the low index contrast waveguide into the high index contrast waveguide;
        a mirror on an angled edge of the optical waveguide, the mirror comprising a polished edge of the die covered with a reflective material; and
    a coupling between the light source and the opto-electronic integrated circuit, wherein the coupling is configured to position the light source so that light from the light source is directed into the optical waveguide by the mirror.

16. The apparatus of claim 15, wherein:

the light source comprises an optical fiber; and the coupling comprises a flip chip package.

17. The apparatus of claim 15, wherein the integrated optical waveguide is laid out in a pattern to distribute the light from the light source about the opto-electronic integrated circuit.

18. The apparatus of claim 17, wherein the pattern comprises a tree structure.

19. The apparatus of claim 17, wherein the pattern comprises at least two branches.

20. The apparatus of claim 15, wherein the mirror is positioned to direct light from above the opto-electronic chip into the integrated optical waveguide.

21. The apparatus of claim 15, wherein the opto-electronic chip incorporates an integrated electronic circuit.

22. The apparatus of claim 21, wherein the integrated electronic circuit comprises a complementary metal-oxide semiconductor (CMOS) circuit.

23. An apparatus comprising:

an opto-electronic chip;

an optical waveguide disposed within the opto-electronic chip in a pattern comprising at least two branches, the integrated optical waveguide comprises a high index contrast waveguide; and a low index contrast waveguide that is spaced apart from the high index contrast waveguide so that light can evanescently couple from the low index contrast waveguide into the high index contrast waveguide; and a mirror formed from an angled edge of the waveguide and a reflective material coated thereon, the mirror positioned to direct light from outside the opto-electronic chip into the optical waveguide.

24. The apparatus of claim 23, wherein the mirror is positioned to direct light from above the opto-electronic chip into the optical waveguide.

25. The apparatus of claim 23, wherein the opto-electronic chip incorporates an optical device.

26. The apparatus of claim 25, wherein the integrated electronic circuit comprises a complementary metal-oxide semiconductor (CMOS) circuit.

* * * * *